United States Patent

[11] 3,618,820

| [72] | Inventor | Eugene Gilson Keeton |
| | | Rte. 2, Trenton, Ky. 42286 |
| [21] | Appl. No. | 2,568 |
| [22] | Filed | Jan. 13, 1970 |
| [45] | Patented | Nov. 9, 1971 |

[54] SEED-SELECTING MECHANISM
5 Claims, 4 Drawing Figs.
[52] U.S. Cl............................................... 221/219
[51] Int. Cl............................................... A01c 9/00
[50] Field of Search............................................ 111/77;
221/217, 219

[56] References Cited
UNITED STATES PATENTS
951,412   3/1910   Baltzer..................... 221/217 X
3,308,774  3/1967   Keeton..................... 111/77

Primary Examiner—Samuel F. Coleman
Attorneys—H. Vincent Harsha, Harold M. Knoth, William A. Murray and John M. Nolan ABSTRACT: A planter provided with a seed-selecting mechanism including a housing rotatable about a horizontal axis and having one end abutting against and cooperating with a fixed plate to form an annular groove having a rotatable bottom. The rotatable grooved bottom has notches circumferentially spaced along its inner side for receiving and elevating a plurality of seeds from a seed supply in the bottom of the housing. Fingers extend radially from the outside to the inside of the housing and are pivotally connected thereto for movement in the notches toward and away from the fixed plate and the fingers are biased to a position wherein they extend closely adjacent the fixed plate. A cam moves the fingers away from the fixed plate as the notches pass through the seed supply and as the notches move upwardly from the seed supply, the fingers are successively disengaged from the cam and pivot to pin a seed against the fixed plate. A discharge opening in the fixed plate is in the path of the rotating fingers and the fingers eject the pinned seeds therethrough.

*INVENTOR.*
EUGENE G. KEETON

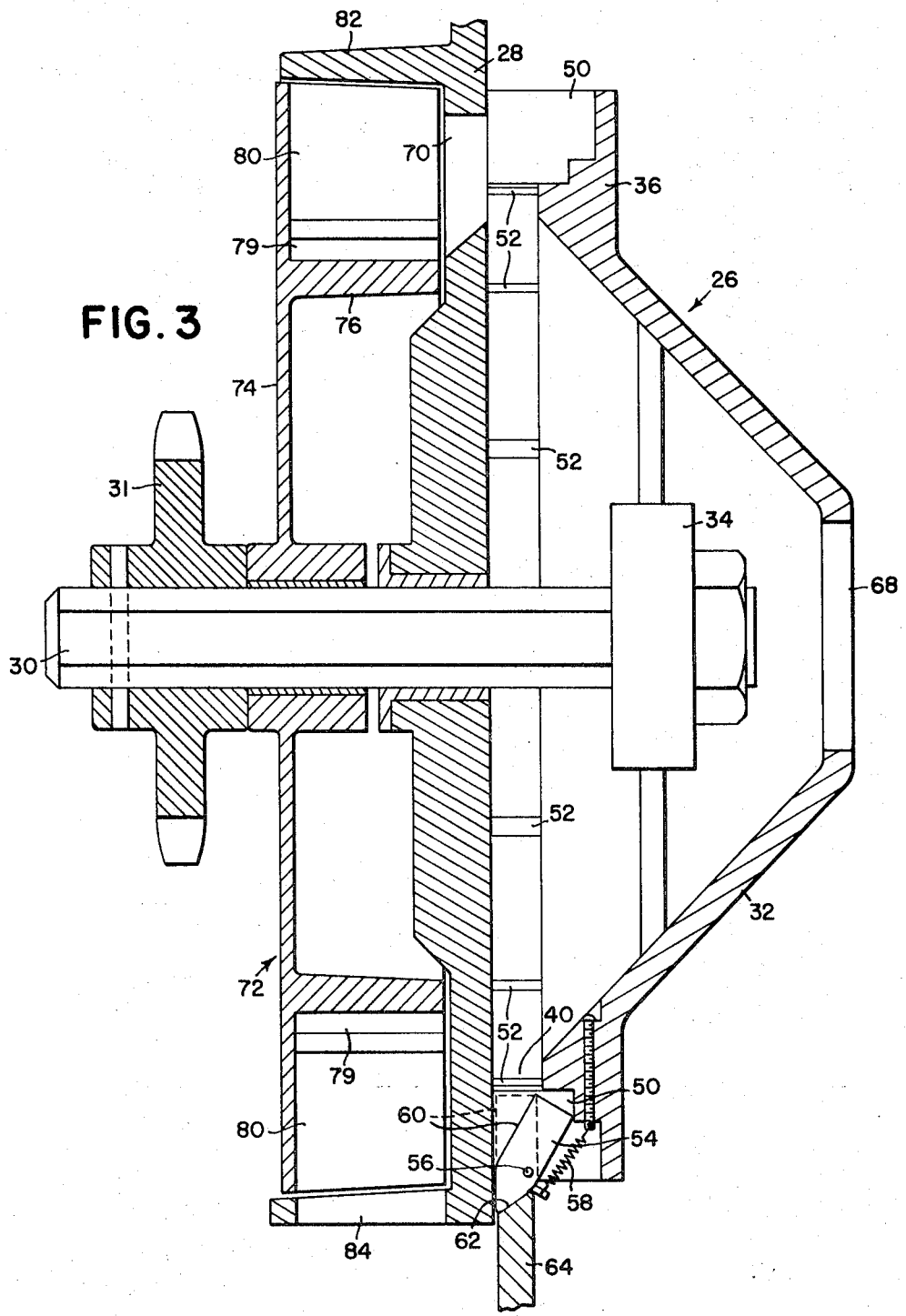

3,618,820

SEED-SELECTING MECHANISM

BACKGROUND OF THE INVENTION

This invention relates to a seed planter and more particularly relates to novel seed-selecting means for planters utilizing rotatably mounted fingers instead of notches or perforated seed plates for delivering seeds from a supply to a discharge point.

Heretofore, plateless planters of the above-noted type have used a finger-carrying plate for selecting individual seeds from a supply of seeds in the housing. These selecting means require specially configured fingers in order to properly pick up seeds as the fingers are rotated through the seed supply. Also, the fingers are subjected to wear and bending forces as they rotate through the seed supply.

SUMMARY OF THE INVENTION

According to the present invention, there is provided a novel seed-selecting mechanism for a plateless planter and more particularly there is provided a mechanism which is simply constructed and subject to a minimum of wear.

More specifically, it is an object of the invention to provide a seed-selecting mechanism having rugged, simply configured selecting fingers.

A further object is to mount the fingers in such a way that they will not be subjected to bending as they rotate through the seed supply.

A more specific object is to provide a horizontally disposed, generally conical housing having a rim at its base and to mount the fingers at circumferentially spaced locations in slots around the rim.

Another specific object is to abut the rim of the housing against a fixed plate that cooperates with the rim to form an annular groove about the axis of the housing, to provide seed pickup notches in the groove, and to mount the fingers for cooperation with the notches and grooves to select single seeds from a seed supply in the bottom of the housing.

These and other objects will become apparent from the ensuing description and appended drawings.

BRIEF DESCRIPTION OF THE DRAWINGS

FIG. 3 is a sectional view taken along line 3—3 of FIG. 2, but with the seed conveyor fins removed.

DESCRIPTION OF THE PREFERRED EMBODIMENT

Figure 1:
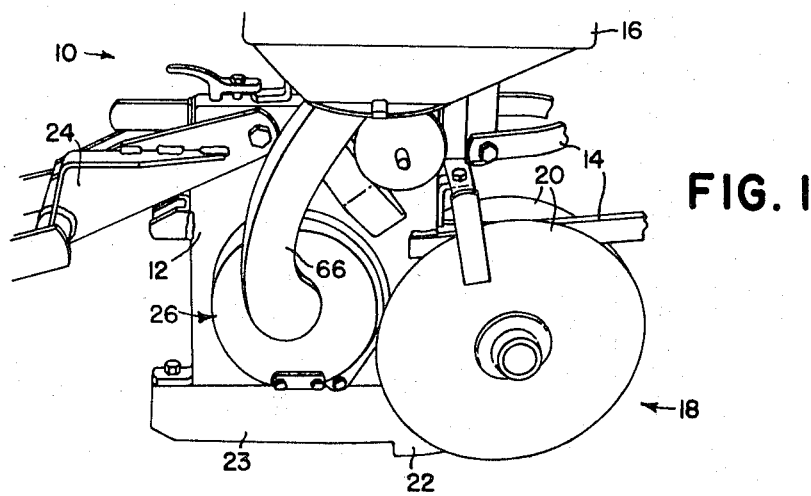
FIG. 1 is a perspective partial view of a plateless planter unit in which the present invention is embodied.

In FIG. 1, a plateless planter unit is designated in its entirety by the reference numeral 10 and includes a frame 12 which is connected to a tool bar (not shown) by means of draft members 14. A seed hopper 16 is supported at the top of and a seed drill assembly 18 is supported at the bottom of the frame 12 beneath the hopper 16. The seed drill assembly 18 includes a pair of furrow opener disks 20 and a runner 22, the latter being of conventional construction and including a pair of spaced vertical plates 23 between which seeds are deposited. A linkage 24 is pivoted to the rear of the frame 12 and has connected thereto, in trailing relation to the drill assembly 18, a furrow-closing tool and/or a packer wheel assembly (not shown).

Mounted centrally on the frame 12 between the hopper 16 and the drill assembly 18 is a combined seed selecting and depositing mechanism 26. As can best be seen in FIG. 3, the seed-depositing and seed-selecting portions of the mechanism 26 are separated by a vertically disposed, generally circular plate 28 which is fixed in a suitable manner (not shown) to the frame 12. A horizontal, transversely extending drive shaft 30 is rotatably mounted in the plate 28 and has a drive sprocket 31 fixed to one end adapted for connection to drive means (not shown).

Figure 2:
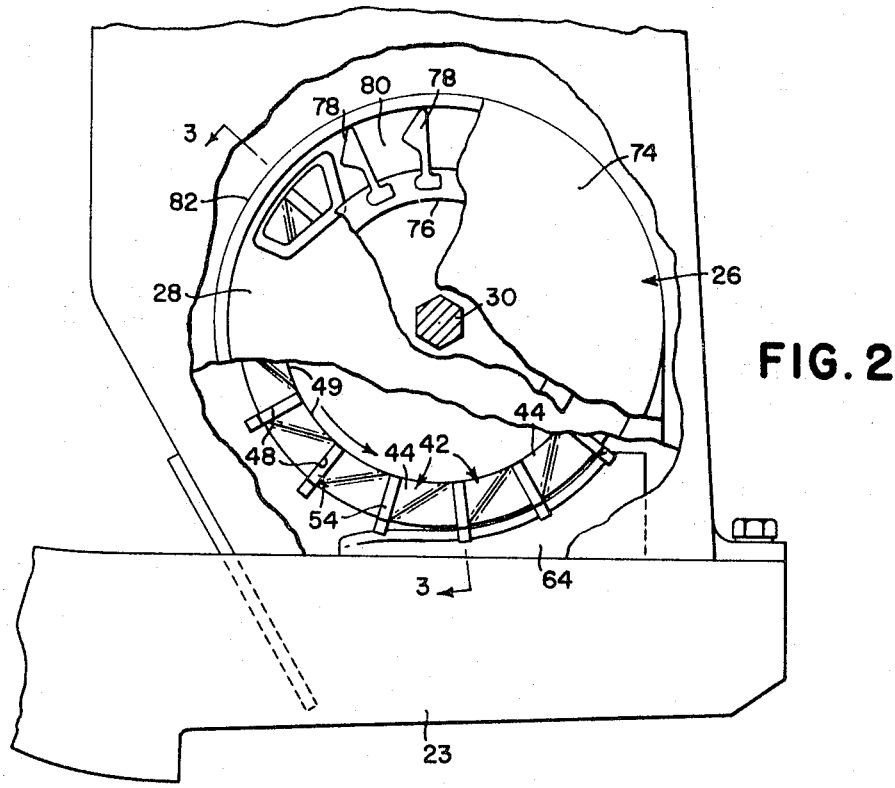
FIG. 2 is a side view of the seed-selecting and seed-depositing mechanism of the planter unit with parts broken away.
Figure 4:
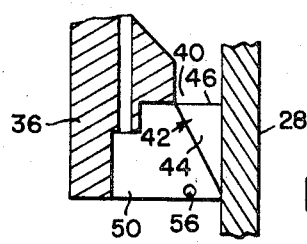
FIG. 4 is a sectional view similar to FIG. 3, but showing only the portion showing the seed pickup groove.

The seed-selecting portion of the mechanism 26 includes a generally conical housing 32 which encloses the right end (as viewed from the rear of the unit 10) of and is connected for rotation with the shaft 30 by means of a hub and spoke structure 34. At the base of the conical housing 32 is a rim 36 which is in axial abutting engagement with the fixed plate 28. The interior wall of the housing 32 is stepped radially outwardly at its base, which step cooperates with the fixed plate to form an annular groove 40. A plurality of equal spaced seed pickup notches 42 are located in the bottom of the groove 40 and have sides 44 inclined with respect to the direction of rotation, indicated by the arrow in FIG. 2, radially from a leading edge 46 to the radially outward bottom of a radially extending trailing side 48 and axially outwardly from a circumferentially extending inner edge 49 to the fixed plate 28. The rim 36 has a plurality of circumferentially spaced slots 50 which extend radially from the outside of the rim 36 and respectively extend to the notches 42 to form openings 52 which extend along the trailing sides 48 of the notches 42. A plurality of flat, generally rectangular fingers 54 are respectively pivotally mounted by means of pins 56 in the slots 50 for axial swinging movement toward and away from the fixed plate 28. The fingers 54 are biased by tension springs 58 to normal positions wherein the fingers extend radially along the trailing sides 48 of the notches 42 and have one side 60 extending parallel and closely adjacent to the fixed plate 28. The fingers 54 have tapered ends 62 which extend radially outwardly of the housing rim 36 and an arcuate cam 64 is fixed to the frame 12 and extends along a lower portion of the rim 36 in a position for engaging successive ones of the fingers, as the fingers move to the lower portion of their path of rotation, to move the fingers to a retracted position wherein the sides 60 of the fingers are generally in the plane of the tapered sides 44 of the notches 42. Thus, the fingers 54 are always supported at their trailing sides to eliminate the effects of bending forces and are retracted during most of the rotation of the housing through the seed supply to eliminate wear.

A conduit 66 is connected between the bottom of the hopper 16 and an opening 68 in the apex of the conical housing 32 to convey seeds to the housing wherein they gravitate along the wall of the housing to the groove 40. Thus, a seed pickup zone is established in the lower portion of the groove 40 and as the notches 42 rotate through the seed supply, they pick up groups of seeds. As the notches proceed upwardly from the seed supply, the fingers 54, which are retracted upon entering the seed supply, rotate past the cam 64 and are released to pin a single seed against the fixed plate. The seeds remaining in the notch fall back to the supply and the pinned seeds are moved along a circular path on the plate by the fingers. A discharge opening 70 extends radially through the plate 28 at an upper location in the path of the rotation of the fingers and as the fingers pass over the opening 70, they eject the pinned seeds therethrough.

The seed-depositing portion of the mechanism 26 is located axially adjacent the pickup plate 28 on the side opposite the seed-selecting portion and includes a generally circular rotary conveyor 72 which is fixed for rotation with the shaft 30. The rotary conveyor 72 includes an outer plate 74 having an axially extending rim 76 which terminates adjacent the fixed plate 28 and traces a path which passes immediately adjacent the bottom of the opening 70. A plurality of radially extending fins 78 are removably mounted in and project outwardly from a plurality of circumferentially spaced openings 79 in the rim 76 to form cells 80 for receiving the seeds as they are ejected through the discharge opening 70. The fixed plate 28 has an axially extending rim 82 adjacent the outer ends of the fins 78 which extends to the outer plate 74 of the conveyor 72. The rim 82 has a discharge opening 84 at the bottom thereof through which seeds are discharged between the upright plates 23 of the runner 22.

In operation, seed supplied from the hopper 16 to the housing 32 gravitates along the wall of the housing to form a supply of seeds in the seed-selecting zone in the bottom portion of the housing 32. The tapered ends 62 of those fingers 54 at the bottom portion of their path of rotation are in engagement with the cam 64 and the fingers are in their retracted positions wherein their sides 60 are pivoted away from the fixed plate 28. As the housing rotates, seeds in the notches 42 gravitate along the inclined sides 44 to the trailing sides 48 and the fingers 54 successively rotate past the cam 64 and are released to pin a single seed against the fixed plate 28. The pinned seeds are then carried by the fingers 54 to the discharge opening 70 through which they are ejected into the cells 80. Depending on the number of cells 80 in relationship to the fingers 54, either a single seed or a plurality of seeds are ejected into one cell. The cells then rotate past the opening 84 and the seed or seeds therein are deposited between the upright plates 23 of the furrow runner 22.

I claim:

1. In a plateless planter, a seed-selecting mechanism comprising: a walled enclosure including an interior annular groove disposed about a generally horizontal axis and having at least one fixed side; said enclosure including a portion adjacent said fixed side mounted for rotation about said axis; a plurality of circumferentially spaced openings extending substantially radially through the wall of said rotatable enclosure portion into said groove; a plurality of seed-selecting fingers mounted one each in each of said openings for movement between a released position closely adjacent said fixed side and a retracted position completely within the wall of said rotatable enclosure; means biasing said fingers toward said released position; cam means mounted in the lower portion of the path of rotation of said fingers for engaging and moving the fingers to said retracted position and for subsequently releasing the fingers as they travel upwardly in the path of rotation whereby a single seed of a supply of seeds in the bottom of the enclosure will be pinned against the fixed side by each released finger; and a seed discharge opening in the fixed side in the path of rotation of the fingers adapted to receive the pinned seeds.

2. The invention defined in claim 1, wherein a plurality of circumferentially spaced seed pickup notches are in the bottom of the groove and the fingers respectively move into the notches.

3. The invention defined in claim 2, wherein the notches include a side which is inclined radially outwardly from a leading edge to the bottom of a radially extending trailing side and said inclined side also being inclined from a circumferentially extending inner edge radially outwardly to the fixed side of the groove and wherein the fingers are mounted for movement closely adjacent said trailing side.

4. The invention defined in claim 3, wherein the fingers are generally rectangular and flat having a flat side adjacent the trailing side of the notch and having an edge disposed such that it extends adjacent to and parallel to the fixed side of the groove when the fingers are in their released condition and said edge also being disposed such that it lies generally in the plane of the inclined side of the notch when the fingers are in their retracted condition.

5. The invention defined in claim 1 wherein the fingers extend exteriorly of the enclosure wall and wherein the cam means is mounted exteriorly of the enclosure for engaging the radially outer ends of the fingers.

* * * * *